United States Patent [19]

Nambu et al.

[11] 4,456,732
[45] Jun. 26, 1984

[54] THERMOPLASTIC RESIN COMPOSITION HAVING IMPROVED WELD STRENGTH

[75] Inventors: Junji Nambu; Kenji Yoshino; Nagao Ariga; Kyotaro Shimazu, all of Chiba; Hiroyuki Sato, Yachiyo, all of Japan

[73] Assignee: Dainippon Ink and Chemicals, Inc., Tokyo, Japan

[21] Appl. No.: 503,167

[22] Filed: Jun. 10, 1983

[30] Foreign Application Priority Data

Jun. 15, 1982 [JP] Japan ................................ 57-101406

[51] Int. Cl.$^3$ ...................... C08L 69/00; C08L 63/04
[52] U.S. Cl. ........................................ 525/65; 525/67; 525/285; 525/930
[58] Field of Search ................... 525/65, 67, 530, 930, 525/463, 285

[56] References Cited

U.S. PATENT DOCUMENTS 3,480,695  11/1969  Hale ..................................... 525/930
4,351,920   9/1982  Ariga et al. ............................ 525/67

*Primary Examiner*—Theodore E. Pertilla
*Attorney, Agent, or Firm*—Sherman & Shalloway

[57] ABSTRACT

A thermoplastic resin composition having improved weld strength, said composition consisting essentially of
(A) 45 to 94.9% by weight of polycarbonate resin,
(B) 5 to 40% by weight of a rubber-modified styrene-maleic anhydride copolymer resin, and
(C) 0.1 to 15% by weight of an epoxy resin and/or a phenoxy resin.

8 Claims, No Drawings

THERMOPLASTIC RESIN COMPOSITION HAVING IMPROVED WELD STRENGTH

This invention relates to a novel and useful thermoplastic resin composition. More specifically, this invention relates to a polycarbonate-type resin composition which is useful as engineering plastics and can increase the weld strength of a weld line generated in an injected or extruded molded article prepared therefrom.

Polymer alloys composed of multiple components which are among the engineering plastics have the defect that when the properties of a molded article prepared therefrom are evaluated, the weld strength of a weld line is generally much lower than the strength of parts having no weld line. For example, even the polymer alloy disclosed in U.S. Pat. No. 4,351,920 which is composed of a rubber-modified styrene-maleic anhydride copolymer resin and a polycarbonate resin and is characterized by having excellent moldability and impact strength cannot be said to have a high strength on a weld line generated in its injection molded article.

Attempts to improve strength on weld lines have heretofore been made by, for example, increasing the flowability or molding temperature of the resin used, or controlling the mold temperature. But none of them have resulted in significant improvements, and the products obtained have not proved to be suitable for practical applications.

It is an object of this invention therefore to improve the weld strength of weld lines of molded articles obtained from known polymer alloys such as the one composed of a polycarbonate resin and a rubber-modified styrene-maleic anhydride copolymer resin disclosed in the above-cited U.S. Patent.

It has now been found that this object of the invention is achieved by adding an epoxy resin and/or a phenoxy resin as a third component to the components of the aforesaid polymer alloy.

Thus, according to this invention, there is provided a thermoplastic resin composition capable of giving injection or extrusion molded articles having excellent impact strength and heat resistance with excellent moldability, said composition consisting essentially of (A) 45 to 94.9% by weight, preferably 70 to 85% by weight, of a polycarbonate resin, (B) 5 to 40% by weight, preferably 9 to 27% by weight, of a rubber-modified styrene/maleic anhydride copolymer resin, and (C) 0.1 to 15% by weight, preferably 3 to 6% by weight, of an epoxy resin and/or a phenoxy resin.

The polycarbonate resin (A) denotes a polymer having recurring units of the following formula.

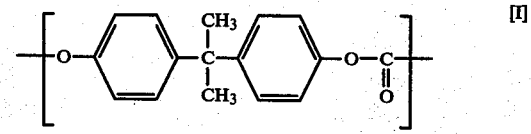

This includes aliphatic, aromatic or aromatic-aliphatic polycarbonate resins which are obtained, for example by the phosgene method or ester-interchange method. Also included within this polymer are copolycarbonates (homo-bonded copolymers) derived from different dihydroxy compounds as starting materials, and copolycarbonates (hetero-bonded copolymers) having in the main chain a carbonate bond and another bond such as an ester, urethan or siloxane bond. The polycarbonate resin (A) preferably has a number average molecular weight in the range of 10,000 to 50,000.

The rubber-modified styrene-maleic anhydride copolymer (B) denotes a copolymer obtained by thermally polymerizing styrene and maleic anhydride together with a rubber component in the presence of a chain transfer agent, a stabilizer, and/or a radical generator, and preferably has a number average molecular weight in the range of 100,000 to 300,000. Suitably, the copolymer resin (B) contains the rubber component constituting the modified copolymer resin (B) in an amount of 2 to 25% by weight, preferably 5 to 12% by weight.

The copolymer resin (B) is obtained, for example, by adding a monomeric mixture of styrene and maleic anhydride in a mole ratio of from 1.4 to 49, preferably from 4.6 to 17, a rubber component and a conventional radical generator and chain transfer agent to a ketone solvent such as acetone or methyl isobutyl ketone, and thermally polymerizing the monomeric mixture at a temperature of 60° to 180° C., preferably 75° to 140° C. The copolymer resin (B) thus obtained is precipitated by using a poor solvent for the resin, such as petroleum benzin or methanol. The precipitate is used in this invention after it is pelletized in an extruder or the like either alone or optionally together with conventional additives such as an antioxidant.

Typical examples of the rubber component include polybutadiene rubber; butadiene-styrene rubber or butadiene-acrylonitrile rubber containing 60 to 95% by weight of butadiene; isoprene-styrene rubber or isoprene-acrylonitrile rubber containing 60 to 95% by weight of isoprene; A-B type butadiene-styrene block copolymer rubber or A-B-A type butadiene-styrene block copolymer rubber containing 60 to 95% by weight of butadiene; ethylene-propylene copolymer rubber (EPT); and ethylene-propylene-cyclopentadiene copolymer rubber (EPDM). These rubbers may be used singly or in combination.

Typically, the epoxy resin (C) is a bisphenol-type epoxy resin represented by the general formula

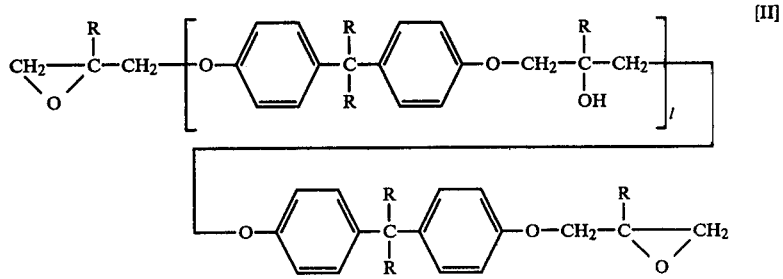

wherein R represents a hydrogen atom or a methyl group, and l is a rational number of from 0 to 200.

Novolak-type epoxy resins obtained from compounds having a phenol group and compounds having an alkylphenol group and represented by the following general formula

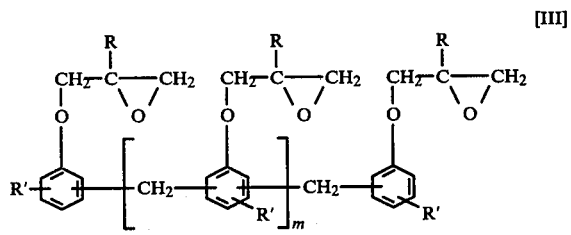

wherein R represents a hydrogen atom or a methyl group, R' represents an alkyl group having 1 to 9 carbon atoms, and m is a rational number of from 0 to 50, are also included within the epoxy resin (C) used in this invention. The term "epoxy resins", used herein, is thus not restricted to its narrow sense.

The bisphenol-type epoxy resin can be prepared, for example, by reacting 1 mole of bisphenol A or bisphenol F with 1.5 to 8 moles, preferably 1.8 to 4.4 moles, of epichlorohydrin in the presence of an alkaline catalyst at a temperature of 50° to 140° C., separating the aqueous layer after the reaction, and distilling the resulting oil layer under reduced pressure to remove the epichlorohydrin, optionally after the oil layer is washed with water and a weak acid such as NaHPO4.

Specific examples of the epoxy resin (C) include bisphenol A-type epoxy resins designated by tradenames "Epiclon-850, -1050, -4050, -7050 and -9050"; bisphenol F-type epoxy resins designated by tradenames "Epiclon-830 and -831"; novolak-type epoxy resins designated by tradenames "Epiclon N-670, N-673, N-680, N-690, N-695, N-730, N-738, N-740, N-660, and N-665"; and products designated by tradenames "Epiclon 152 and 1120" prepared by using brominated phenol as a material (all of which are manufactured and sold by Dainippon Ink and Chemicals, Inc.).

The phenoxy resin (C) denotes a resin obtained by the reaction of bisphenol A with epichlorohydrin and having recurring units of the general formula

[IV]

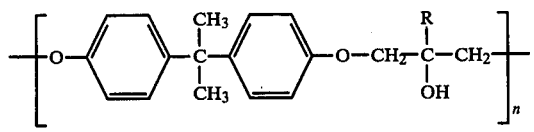

wherein R represents a hydrogen atom or a methyl group, and n is a rational number of from 3 to 200.

Preferably, the phenoxy resin (C) used in this invention has a viscosity, determined for its methyl ethyl ketone solution having a solid content of 40%, of 2,800 to 10,000 centipoises. Specific examples of the phenoxy resin (C) are "UCRA phenoxy resins PKHJ, PKHH and PKHC" (tradenames of products commerically available from Union Carbide Corporation, U.S.A.).

At least one such epoxy resin or at least one such phenoxy resin may be used. Or at least one such epoxy resin and at least one such phenoxy resin may be used together.

The resin composition of this invention can be prepared, for example, by blending the polycarbonate resin (A), the rubber-modified styrene-maleic anhydride copolymer resin (B) and the epoxy resin and/or the phenoxy resin (C) each in the form of pellets or powder in the heat-melted state by a conventional method by using a roll, a Banbury mixer, an extruder, etc. The resin composition of this invention may also be a dry blend of the pellets of the above components (A), (B) and (C) which is obtained without heat melting. Even when such a dry blend is directly fed to an injection molding machine, the resulting molded article has properties nearly equivalent to those of a molded article prepared from the heat-melted blend described above.

During the blending procedure, known conventional additives such as antioxidants, antistatic agents, ultraviolet absorbers, coloring agents, inorganic fillers and plasticizers may, as required, be added to the composition of this invention.

The resin composition of this invention so obtained gives an injection or extrusion molded article having a very good strength on weld lines in spite of the fact that it is a multi-component polymer alloy.

The following Examples and Comparative Examples illustrate the present invention more specifically.

EXAMPLE 1

1700 g of "IUPILON S-2000" (a tradename for a polycarbonate resin manufactured by Mitsubishi Gas Chemical Company, Inc.), 210 g of a rubber-modified styrene-maleic anhydride copolymer resin containing 10% by weight of a rubber component and 90 g of "UCRA phenoxy resin PKHH", each in the form of pellet, were blended. The blend was extruded by an extruder (a hot cut-type extruder with a cylinder diameter of 26 mm, manufactured by Sanjo Seiki Co., Ltd.) to form pellets.

The pellets were then molded by an injection molding machine while maintaining the molding cylinder temperature of 280° C. and the mold temperature at 80° C. to form a dumbbell test specimen for tensile strength measurement having a centrally located weld line and a dumbbell test specimen for tensile strength measurement having no weld line at the center. In the preparation of the former dumbbell specimen, there was used such a dumbbell mold in which the resin flowed in from both terminal gates to generate a weld line at the center. In the preparation of the latter dumbbell specimen, there was used such a dumbbell mold in which the resin flowed in from one of the terminal gates and therefore a weld line did not form at the center.

Each of the dumbbell test specimens obtained was pulled at a rate of 5 mm/min. by using a "SHIMADZU AUTOGRAPH IS-2000" made by Shimadzu Seisakusho Co., Ltd., and the tensile strengths at break and elongations of the test specimens were measured. The results are shown in Table 1.

EXAMPLE 2

Pellets and dumbbell test specimens were prepared, in the same way as in Example 1 except that "Teijin Panlite L-1250" (tradename for a polycarbonate resin manufactured by Teijin Chemicals Ltd.) was used instead of "IUPILON S-2000", and "UCRA phenoxy resin PKHJ" was used instead of the "UCRA phenoxy resin PKHH". The properties of these test specimens measured in the same way as in Example 1 are summarized in Table 1.

EXAMPLE 3

Pellets and dumbbell test specimens were prepared in the same way as in Example 1 except that "NOVAREX 7025A" (a tradename for a polycarbonate resin manufactured by Mitsubishi Chemical Industries, Ltd.) was used instead of "IUPILON S-2000", and "UCRA phenoxy resin PKHC" was used instead of "UCRA phenoxy resin PKHH". The properties of these test specimens measured in the same way as in Example 1 are shown in Table 1.

EXAMPLES 4 TO 8

Pellets of "UCRA phenoxy resin PKHH" were added to a mixture of 1700 g of pellets of Novarex 7025A and 300 g of a rubber-modified styrene-maleic anhydride copolymer resin containing 10% by weight of a rubber component so that the content of the phenoxy resin became 0.75, 1.5, 3.0, 4.5 or 10.0% by weight (i.e., 15 g, 31 g, 62 g, 94 g, or 222 g). By a dry-blending procedure, five kinds of pellet mixtures were obtained.

Pellets and dumbbell test specimens were prepared from these pellet mixtures in the same way as in Example 1. The properties of these test specimens measured in the same way as in Example 1 are shown in Table 2.

EXAMPLE 9

Pellets of "IUPILON S-2000" (1,700 g), 567 g of pellets of a rubber-modified styrene-maleic anhydride copolymer resin containing 10% by weight of a rubber component and 197 g of pellets of "Epiclon 7050" were dry-blended by a tumbler. The pellet mixture was fed into a hot cut-type extruder (cylinder diameter 26 mm), and extruded at a resin temperature of 180° C. to form pellets.

The pellets were injection-molded in the same way as in Example 1 except that the molding cylinder temperature was maintained at 250° C. and the mold temperature, at 70° C. Thus, dumbbell test specimens were prepared. The properties of the test specimens measured in the same way as in Example 1 are shown in Table 3.

EXAMPLE 10

Pellets of "Teijin Panlite L-1250" (1,500 g), 130 g of pellets of a rubber-modified styrene-maleic anhydride copolymer resin containing 13% by weight of a rubber component and 104 g of pellets of "Epiclon 9050" were dry-blended to prepare a pellet mixture. Pellets and dumbbell test specimens were prepared from the dry blend in the same way as in Example 1. The properties of the test specimens measured in the same way as in Example 1 are shown in Table 3.

COMPARATIVE EXAMPLE 1

Dumbbell test specimens were prepared in the same way as in Example 1 except that "UCRA phenoxy resin PKHH" was not used. The properties of the test specimens measured in the same way as in Example 1 are shown in Table 1.

COMPARATIVE EXAMPLE 2

A dry blend, pellets and dumbbell test specimens were prepared in the same way as in Examples 4 to 8 except that the "UCRA phenoxy resin PKHH" was not used. The properties of the test specimens measured in the same way as in Example 1 are shown in Table 2.

COMPARATIVE EXAMPLES 3 AND 4

As a control, dumbbell test specimens were prepared from "Cycoloy 800" (a product of Ube Cycon Ltd.) composed of a polycarbonate resin and an ABS resin and generally called a polymer alloy, or "Xyron 500V" (a product of Asahi-Dow Co., Ltd.) which is a styrene grafted polyphenylene ether type resin and generally not always called a polymer alloy, in the same way as in Example 1. The properties of these test specimens measured in the same way as in Example 1 are shown in Table 3.

TABLE 1

|  |  | Example | | | Comparative |
|---|---|---|---|---|---|
|  |  | 1 | 2 | 3 | Example 1 |
| Weld line | Tensile strength at break (kg/cm$^2$) | 568 | 520 | 522 | 389 |
|  | Elongation (%) | 7.2 | 6.8 | 6.0 | 1.7 |
| Non-weld line | Tensile strength at break (kg/cm$^2$) | 605 | 606 | 575 | 550 |
|  | Elongation (%) | 111 | 114 | 108 | 100 |

TABLE 2

| | Example | | | | | Comparative Example 2 |
|---|---|---|---|---|---|---|
| | 4 | 5 | 6 | 7 | 8 | |
| Content of the phenoxy resin (wt. %) | 0.75 | 1.5 | 3.0 | 4.5 | 10.0 | 0 |
| Weld line Tensile strength at break (kg/cm$^2$) | 455 | 460 | 511 | 568 | 600 | 400 |
| Elongation (%) | 4.1 | 5.4 | 7.2 | 10.0 | 11.2 | 1.8 |

TABLE 3

| | Example | | Comparative Example | |
|---|---|---|---|---|
| | 9 | 10 | 3 | 4 |
| Type of the weld strength improver | Epiclon 7050 | Epiclon 9050 | — | — |
| Weld line Tensile strength at break (kg/cm$^2$) | 515 | 520 | 460 | 499 |
| Elongation (%) | 5.9 | 6.5 | 4.2 | 4.6 |

What is claimed is:

1. A thermoplastic resin composition having improved weld strength, said composition consisting essentially of
   (A) 45 to 94.9% by weight of a polycarbonate resin,
   (B) 5 to 40% by weight of a rubber-modified styrene-maleic anhydride copolymer resin, and
   (C) 0.1 to 15% by weight of a bisphenol epoxy resin, a novolak epoxy resin, a phenoxy resin or a mixture thereof.

2. The composition of claim 1 wherein the rubber-modified styrene-maleic anhydride copolymer resin (B) contains 2 to 25% by weight of a rubber component.

3. The composition of claim 1 wherein the resin (C) is a bisphenol-type epoxy resin represented by the general formula

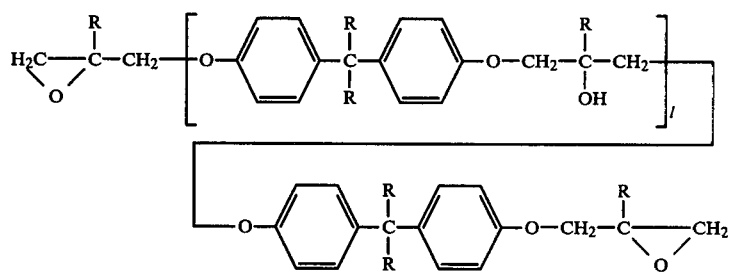

wherein R represents a hydrogen atom or a methyl group, and l is a rational number of from 0 to 200.

4. The composition of claim 1 wherein the resin (C) is a novolak-type epoxy resin represented by the general formula

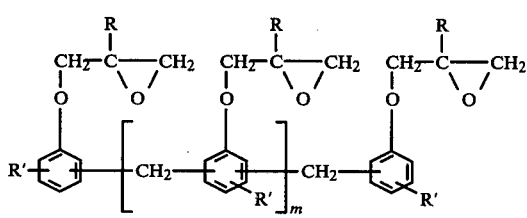

wherein R represents a hydrogen atom or a methyl group, R' represents an alkyl group having 1 to 9 carbon atoms, and m is a rational number of from 0 to 50.

5. The composition of claim 1 wherein the resin (C) is a resin having recurring structural units of the general formula

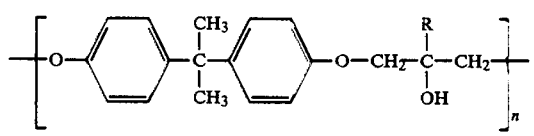

wherein R represents a hydrogen atom or a methyl group, and n is a rational number of from 3 to 200.

6. A thermoplastic resin composition having improved weld strength, said composition consisting essentially of
   (A) 70 to 85% by weight of a polycarbonate resin,
   (B) 9 to 27% by weight of a rubber-modified styrene/maleic anhydride copolymer, and
   (C) 3 to 6% by weight of a bisphenol epoxy resin, a novolak epoxy resin, a phenoxy resin or a mixture thereof.

7. The thermoplastic resin composition of claim 6 wherein the polycarbonate resin is an aromatic polycarbonate resin derived from an aromatic dihydroxy compound.

8. The thermoplastic resin composition according to claim 1 wherein the polycarbonate resin is an aromatic polycarbonate resin derived from an aromatic dihydroxy compound.

* * * * *